(12) United States Patent
Hirtzlin et al.

(10) Patent No.: US 9,390,551 B2
(45) Date of Patent: Jul. 12, 2016

(54) METHOD FOR ESTIMATION OF INFORMATION REPRESENTATIVE OF A PIXEL OF A VIRTUAL OBJECT

(75) Inventors: Patrice Hirtzlin, Betton (FR); Jean-Eudes Marvie, Betton (FR); Pascal Gautron, Rennes (FR)

(73) Assignee: Thomson Licensing (FR)

( * ) Notice: Subject to any disclaimer, the term of this patent is extended or adjusted under 35 U.S.C. 154(b) by 184 days.

(21) Appl. No.: 13/994,100

(22) PCT Filed: Feb. 28, 2011

(86) PCT No.: PCT/EP2011/052917
§ 371 (c)(1),
(2), (4) Date: Jun. 13, 2013

(87) PCT Pub. No.: WO2012/079775
PCT Pub. Date: Jun. 21, 2012

(65) Prior Publication Data
US 2013/0265310 A1 Oct. 10, 2013

(30) Foreign Application Priority Data
Dec. 16, 2010 (FR) ..................................... 10 60615

(51) Int. Cl.
*G06T 15/04* (2011.01)
*G06T 15/60* (2006.01)
*G06T 15/80* (2011.01)

(52) U.S. Cl.
CPC .................. *G06T 15/60* (2013.01); *G06T 15/04* (2013.01); *G06T 15/80* (2013.01)

(58) Field of Classification Search
CPC ......... G06T 15/04; G06T 15/06; G06T 15/08; G06T 15/50; G06T 15/60; G06T 15/80; G06T 15/506; G06T 17/205; G06T 5/004
See application file for complete search history.

(56) References Cited

PUBLICATIONS

Szirmay-Kalos et al, Displacement mapping on the GPU state of the art, 2008, Computer Graphics Forum, 2008. vol. 27 (2008), No. 6 pp. 1567-1592.*
Lima et al, Displacement Mapping Techniques: Analysis and Comparisons, 2012, SIBGRAPI—Conference on Graphics, Patterns and Images.*
Wang et al., View-Dependent Displacement Mapping, Journal ACM Transactions on Graphics (TOG)—Proceedings of ACM SIGGRAPH 2003 TOG, vol. 22 Issue 3, Jul. 2003, pp. 334-339.*

(Continued)

*Primary Examiner* — Ming Hon
*Assistant Examiner* — Phuc Doan
(74) *Attorney, Agent, or Firm* — Jack Schwartz & Associates, PLLC (57) ABSTRACT

The invention relates to a method for estimating information representative of a pixel of a virtual object. In order to improve the rendering while minimizing the required calculation time, the method comprises defining a first surface element associated with the pixel according to a direction of observation of the virtual object, the first surface element belonging to a representation of the virtual object according to a first level of detail; associating a second surface element with the first surface element, the second surface element being determined by intersection between the direction of observation and a first parametric surface representing the virtual object according to a second level of detail; estimating the information representative of the pixel according to the second surface element and information associated with the second surface element enabling the virtual object to be represented according to a third level of detail.

10 Claims, 6 Drawing Sheets

(56) References Cited

PUBLICATIONS

Mehra, Real-Time Rendering of Mesostructures, 2010, URL: https://www.cs.unc.edu/~ravishm/pubs/btp_report/paper_docs/report.pdf.*

Zhiqiang, Shadow Rendering for Mesostructure Surface Based on Height Gradient Map, Computer Science and Information Technology (ICCSIT), 2010 3rd IEEE International Conference.*

Ritsche, Real-Time Shell Space Rendering of Volumetric Geometry, ACM Graphite 2006.*

Tatarchuk, Dynamic Image Image-Space Per Per-Pixel Displacement Mapping with Silhouette Antialiasing via Parallax Occlusion Mapping, Game Developer Conference, San Francisco, CA, Mar. 2005.*

Huang et al., "A GPU Based Interactive Modeling Approach to Designing Fine Level Features", Graphics Interface 2007, 2007, pp. 305-311.

Schein et al., "Real-Time Geometric Deformation Displacement Maps Using Programmable Hardware", the Visual Computer, Berlin, DE, vol. 21, No. 8-10, Sep. 1, 2005, pp. 791-800.

Szirmay-Kalos et al., "Displacement Mapping on the GPU—State of the Art", Computer Graphics Forum, vol. 25, No. 3, 2006, pp. 1-24. Search Report dated Apr. 14, 2011.

Saif Ali et al., "Compressed Facad Displacement Maps" IEEE Transactions on Visualization and Computer Graphics, vol. 15, No. 2, Mar./Apr. 2009, 1077-2626/09, 2009 IEEE.

Michael Bunnell "Adaptive Tessellation of Subdivision Surfaces with Displacement Mapping", GPU Gems 2, 2005, pp. 109-122.

Chun-Fa Chang et al., "Real-Time Soft Shadow for Displacement Mapped Surfaces", Department of Computer Sceince and Information Engineering, National Taiwan Normal University, ICME International Conference in Multimedia and Expo, 978-1-4244-4291-1/09 2009 IEEE, pp. 1254-1257.

Rong-Qin Chen, "Real-Time Water Rendering Based on the Graphics Hardware Acceleration" School of Mathematics and Information Engineering, Taizhou University,IASP 2009, International Conference on Image Analysis Signal Processing, 978-1-4244-3986-7/09, 2009 IEEE.

Michael Dogget et al., "Adaptive View Dependent Tessellation of Displacement Maps" pp. 1-9, Proc. ACM Siggraph/Eurographics Hardware Workshop (HWWS'00), 2000.

Stefan Gumhold et al., "Multiresolution Rendering With Displacement Mapping", Proc. ACM Siggraph/Eurographics Workshop on Graphics Hardware (HWWS'99), pp. 55-66, 1999.

Paul S. Heckbert et al., Survey of Polygonal Surface Simplification Algorithms School of Computer Science, Carnegie Mellon University, Pittsburgh PA, Multiresolution Surface Modeling Course, SIGGRAPH, pp. 1-29, 1997.

Gabriel Nobrega De Lima et al., "Displacement Mapping Techniques: Analysis and Comparisons", 2012, SIBGRAPHI Conference of Graphics, Patterns & Images.

Peter Lindstrom et al., "Real-Time, Continuous Level of Detail Rendering of Height Fields", pp. 1-14, Proc. ACM Siggraph, 1996.

The-Ket Lu et al., Fast Visualization of Complex 3D Models Using Displacement Mapping, Nanyang Technological University, ISBN: 978-1-56881-470-4,Proceedings of Graphic Interface, 2009 pp. 7-14.

Fabio Policarpo et al., "Real-Time Relief Mapping on Arbitrary Polygonal Surfaces", ACM Siggraph 2005, Symposium on Interactive 3D Graphics and Games, pp. 155-162.

Fabio Policarpo et al., "Relaxed Cone Stepping for Relief Mapping", GPU Gems 3, Chapter 18, pp. 409-428, 2007.

Natalya Tatarchuk, "Dynamic Parallax Occulsion Mapping with Approximate Soft Shadows", Symposium on Interactive 3D Graphics and Games, ACM SI3D, 2006, pp. 63-69.

Lifeng Wang et al., "View-Dependent Displacment Mapping" pp. 334-339, Microsoft Research, Asia, ACM 0730-0301/0700-0334, 2003.

* cited by examiner

METHOD FOR ESTIMATION OF INFORMATION REPRESENTATIVE OF A PIXEL OF A VIRTUAL OBJECT

This application claims the benefit, under 35 U.S.C. §365 of International Application PCT/EP2011/052917, filed Feb. 28, 2011, which was published in accordance with PCT Article 21(2) on Jun. 21, 2012 in English and which claims the benefit of French patent application No. 1060615 filed Dec. 16, 2010.

1. SCOPE OF THE INVENTION

The invention relates to the domain of image synthesis composition and more specifically to the domain of the synthesis and generation of a virtual object of a 3D scene (three-dimensional scene, also known as a virtual environment). The invention is also understood in the context of special effects for a live composition.

2. PRIOR ART

Figure 1:
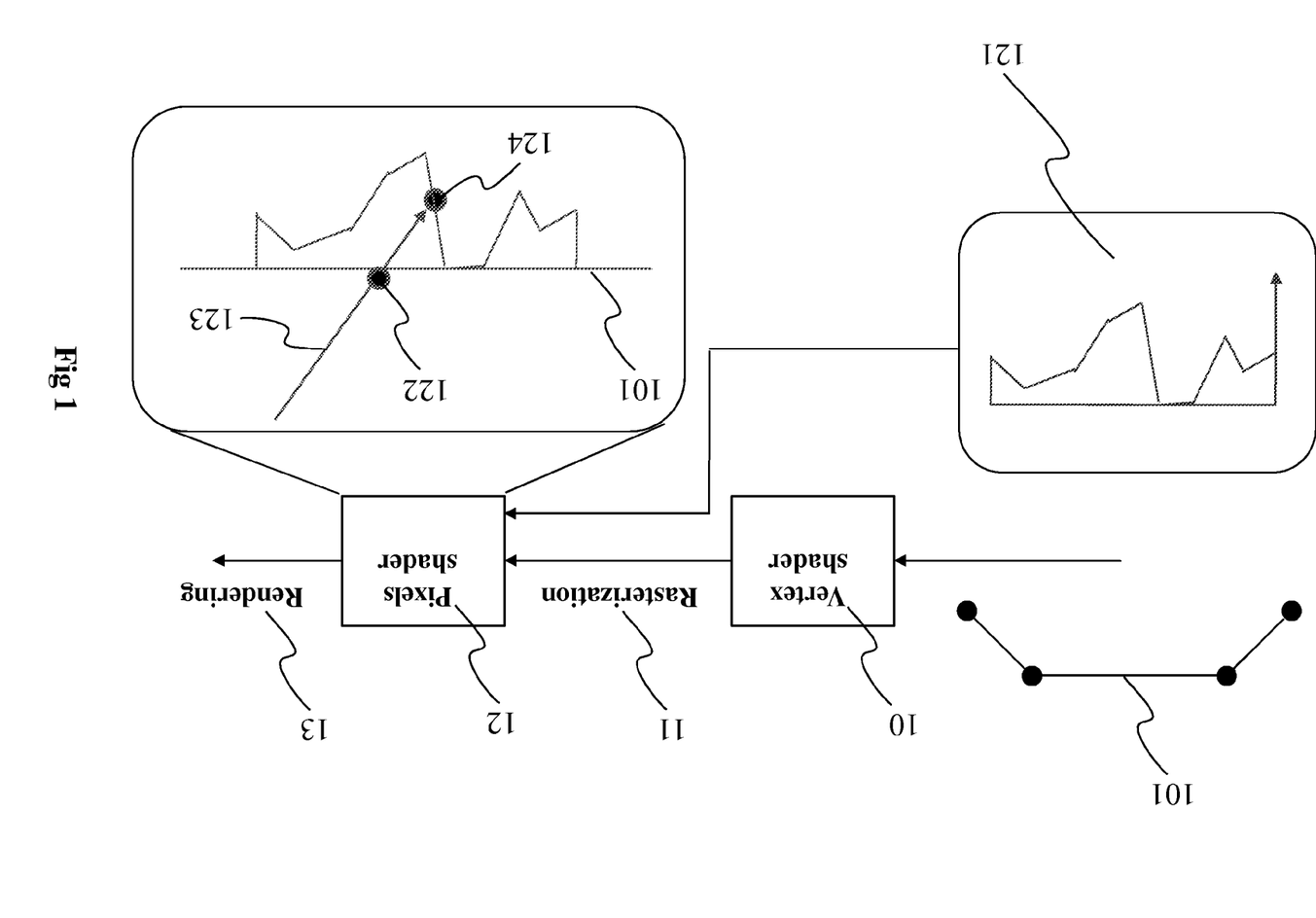
FIG. 1 shows a graphics pipeline for the implementation of a per-pixel displacement mapping technique according to the prior art, FIG. 2 diagrammatically illustrates a graphics pipeline for the implementation of a method for estimation of information representative of a pixel of a virtual object, according to a particular embodiment of the invention, FIGS. 3 and 4 diagrammatically illustrate steps of the method implemented in a module of the graphics pipeline of FIG. 2, according to a particular embodiment of the invention.

According to the prior art, it is known that virtual objects are synthesized from a virtual environment by the generation of very large quantities of polygons to model all of the details, that is to say by the generation of a dense polygonal mesh, requiring heavy or complicated calculations at the instant of the rendering of these objects and limiting the live rendering possibilities. To reduce the calculations required for the rendering, it is known to use specific algorithms based on management of the detail level criterion to reduce the number of vertices and triangles to be processed at the instant of the rendering of objects. Other techniques using the advantages of processing on a GPU (Graphics Processing Unit) enable the required calculations to be simplified, such as for example the technique known as "per-vertex displacement mapping" or the technique known as "per-pixel displacement mapping". Displacement mapping enables the fine details of surfaces of virtual objects (for example a building façade) to be simulated without modifying the geometric definition of the virtual object, being based on a simplified mesh of the object and on the displacement of a texture by use of height maps corresponding to the details of the surface of the object. This technique enables the saturation of the graphic pipeline to be avoided that can cause the processing of a high number of graphic primitives (that describe the way in which the polygons or triangles constituting the mesh of the object are connected to each other). Graphics pipeline architecture for the per-pixel displacement mapping technique is shown in FIG. 1. The graphic pipeline is implemented by a Graphics Processing Unit (GPU) according to a sequencing of established steps, of which some are programmable. The first programmable step is shown by a "vertex shader" 10 that enables shader type microprograms dedicated to the processing of vertices to be executed. The second programmable step is shown by a "pixels shader" 12 that enables shader type microprograms dedicated to the processing of the object resulting from the rasterization step 11. At the input to the vertex shader 10 dedicated to the transformation of vertices are found a set of graphic primitives 101 describing the links between the different vertices constituting the simplified mesh of the virtual object. A depth representative of the detail of the relief that is then associated with the pixel is found at the input of the fragments processor 12 dedicated to the transformation of fragments of height maps 121 (also called relief maps or displacement maps) on which the pixels processor 12 relies to associate with each pixel 122 of the virtual object resulting from the rasterization of vertices. If such a technique enables the live rendering of virtual objects with a high level of detail, this technique has several disadvantages, namely that the details applied to the fragments are limited to a 2.5D representation per height map, the precision of the details geometry is limited to the encoding process, this limitation leading to relatively poor rendering performances for objects having both large details and very fine details, which is the case for building façades (repetition of wall/window models, balconies, bricks relief, etc.), the key parameters of the detail can not be adjusted on-the-fly by an event generated by an animation or a user, and when each object has a particular style (for example has a given architectural style), it is necessary to store a great number of detail styles in the memory that leads to a significant congestion of the memory.

3. SUMMARY OF THE INVENTION

The purpose of the invention is to overcome at least one of these disadvantages of the prior art.

More specifically, the purpose of the invention is notably to optimize the calculation time and/or the calculation power required to estimate live the information representative of a pixel of a virtual object.

The invention relates to a method for estimation of information representative of a pixel of a virtual object, comprising steps for:

defining a first surface element associated with the pixel according to a direction of observation of the virtual object, the first surface element belonging to a representation of the virtual object according to a first level of detail, associating a second surface element with the first surface element, the second surface element being determined by intersection between the direction of observation and a first parametric surface representing the virtual object according to a second level of detail, estimating information representative of the pixel according to the second surface element and information associated with the second surface element enabling the virtual object to be represented according to a third level of detail.

According to a particular characteristic, the first parametric surface is selected from among a set of parametric surfaces.

Advantageously, the first parametric surface selected corresponds to the parametric surface of the set for which the distance separating the first surface element from the second surface element is smallest.

According to a specific characteristic, the information associated with the second surface element is coded in at least one of the maps of a set of maps comprising:

a texture map, and a displacement map.

Advantageously, the method comprises a step of estimation of the lighting of the pixel by calculation of the self-shadowing of the pixel using information enabling the virtual object to be represented according to a third level of detail associated with the pixel and with a plurality of pixels surrounding the pixel.

According to a particular characteristic, the steps of the method are executed live in at least one Graphics Processing Unit (GPU).

4. LIST OF FIGURES

The invention will be better understood, and other specific features and advantages will emerge upon reading the following description, the description making reference to the annexed drawings wherein.

5. DETAILED DESCRIPTION OF EMBODIMENTS OF THE INVENTION

The invention will be described in reference to a particular embodiment of a method for estimation of information representative of a pixel of a virtual object. In order to determine the information representative of a pixel of the virtual object, that is to say for example the colour (that is to say the RGBα components (Red, Green, Blue), α representing the transparency) and the depth, a first surface element belonging to a representation of the virtual object according to a first level of detail (for example a coarse or macroscopic representation) is associated with the pixel in a first step, this first surface element corresponding to the fragment of the virtual object seen by an observer looking at the virtual object through the pixel considered according to a direction of observation. A virtual object is composed of a plurality of fragments, visible or not, a fragment visible to an observer and displayed on a display screen is called a pixel. In a second step, a second surface element is associated with the first surface element, this second surface element having a second level of detail, for example a finer level of detail (for example semi-macroscopic) than the first level of detail of the first surface element. This second surface element is determined by intersection of the direction of observation of the object through the pixel with a first surface defined by a parametric equation describing the representation of the virtual object according to the second level of detail. Finally, in a third step, the information representative of the pixel are determined according to the second surface element with which are associated information that enable the virtual object to be represented with a third level of detail, for example a third level of detail finer than the second level of detail, for example a third level of detail corresponding to microscopic details of the virtual object.

The introduction of a parametric surface, that is to say defined by a parametric equation, enables details of the virtual object to be generated on-demand on a coarse mesh of the 3D macrostructure of the virtual object. The use of an intermediate parametric surface enables the limitations of the prior art to be overcome, for example by enabling parameters of the parametric surface to be adjusted on-demand, the second level details being generated in a procedural way, to provide an adaptable quality per pixel, the procedural generation being able to take into consideration the distance at which the virtual object is viewed, and to minimise the congestion of the memory, even for a high number of objects of the same style due to the compression possibilities inherent in procedural generation.

These advantages and others will be described and explained in more detail in the detailed description of the embodiments of the invention that follows.

Hereafter in the description, the notions of fragments and of pixels will be assimilated to the notion of the pixel for reasons of clarity.

Figure 2:
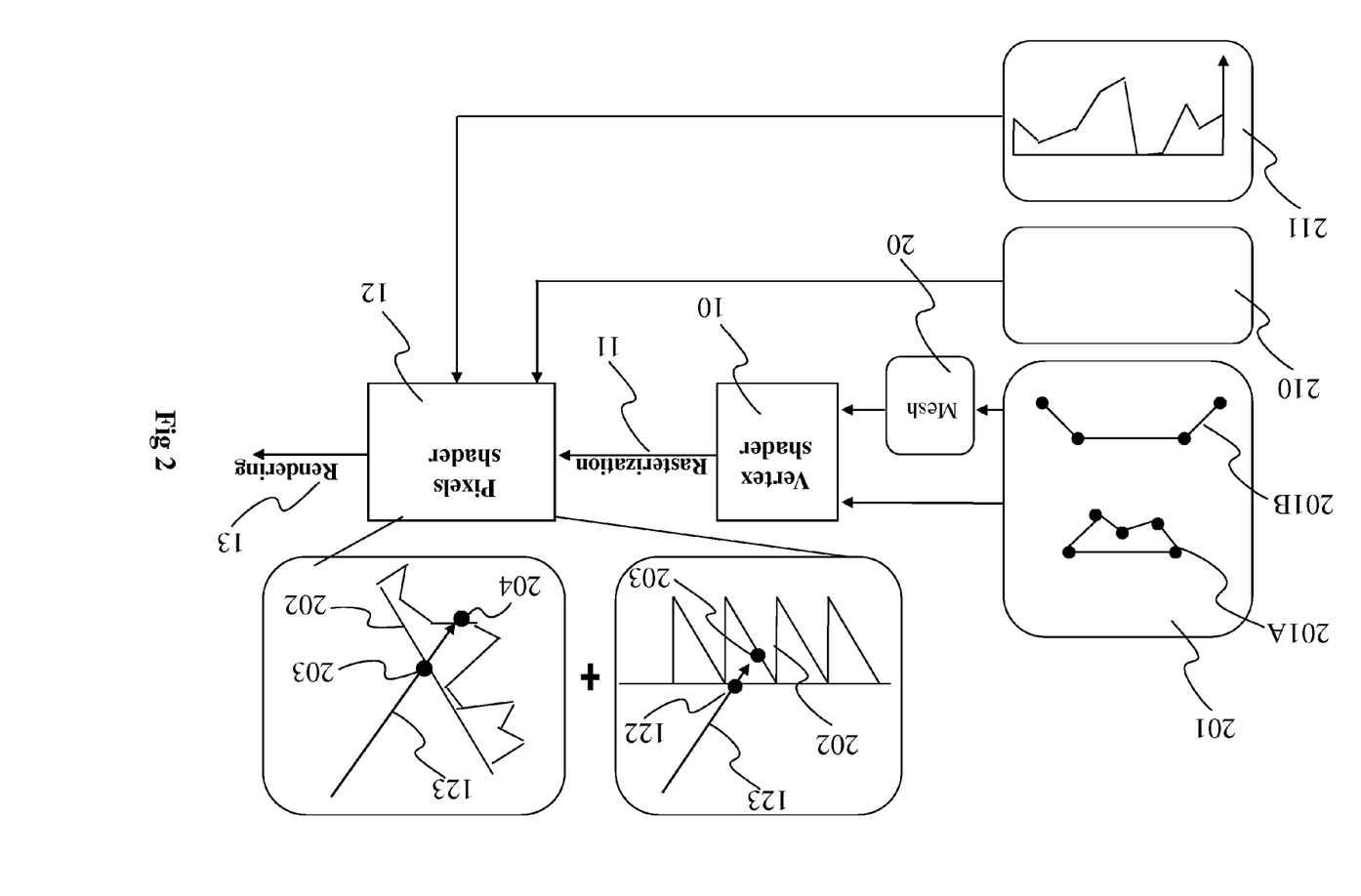

FIG. 2 shows a graphics pipeline adapted for the implementation of the method of the invention, according to a particular and non-restrictive embodiment of the invention. The graphics pipeline is composed essentially from three steps, namely a step of creation of the macrostructure of the virtual object and of details of the virtual object, a step of pre-processing and a step of live calculations.

During the first step of creation the modelling of the 3D macrostructure of the virtual object takes place as well as the creation of descriptions of different levels of detail of the virtual object. The macrostructure of the three-dimensional (called 3D hereafter in the description) virtual object defines the overall structure of the 3D object. It is constituted of a mesh comprising a sparse set of polygons connected by 3D vertices, a mesh on which details will be generated in the GPU(s). The modelling of the 3D macrostructure 201 comprises the generation of the following mesh attributes:

a mesh coordinate index enabling the vertices to be referenced, the coordinates of vertices, for example in the object space, the coordinates of texture associated with the vertices, a normal vector per vertex.

One way to create this 3D macrostructure is to generate a primitive to make an "Indexed Face Set". This can be obtained by using a 3DSMAX® modelling application or a node JavaScript in X3D type script technique. Either generic 201B or specialized 201A macrostructures can be created. Generic 201B macrostructure is understood to mean a 3D mesh not having any information on the adjacencies of vertices. As the addition of details is carried out on-the-fly in the space tangent to the meshed surface on which are added the details, the tangent vector T and the binormal vector B must be calculated in the vertex shader 10. As will be described hereafter, the calculation of these vectors requires knowledge of the coordinates of position and of texture of two adjacent vertices. Thus, an analysis of the mesh topology must be carried out in the pre-processing step, as will be described later, to transmit information relative to these vectors to the vertex shader 10. By specialized macrostructure 201A is understood a 3D mesh having as attributes the coordinates of position and of texture of two adjacent vertices. With this macrostructure type, it is for example easy to create a specialized building macrostructure by extruding the polygon corresponding to the footprint of the building on the number of floors of the building in the direction of the normal vectors to the vertices of the polygon representing the footprint. The adjacency of the mesh (that is to say the definition of the neighbouring area of a vertex, that is to say the vertices neighbouring a given vertex) is thus known by construction for each vertex. The step of pre-processing is then not necessary for the specialized macrostructures as the attributes of two adjacent vertices necessary to the vertex shader 10 are known and do not have to be determined.

The creation of descriptions of details of the 3D object corresponds to the creation of second level details 203 (for example semi-macroscopic details) and to the creation of third level details 204 (for example microscopic details). The descriptions of second level details are provided directly to the pixels processor 12 of the GPU in the form of parameters (of sample or atomic type) 210. These parameters are used in the parametric functions stored in the pixels processor 12 in order to generate, per pixel, a parametric surface element of second level detail. These parameters 210 are advantageously defined by a user. The descriptions of third level detail provided to the pixels processor are stored in depth maps, a depth map being for example associated with a parametric function (stored in the pixels shader 12).

According to a variant, a same depth map is associated with several parametric functions. The third level details are associated with the second level details using the parameters 210 enabling the second level surface elements to be generated.

Figure 3:
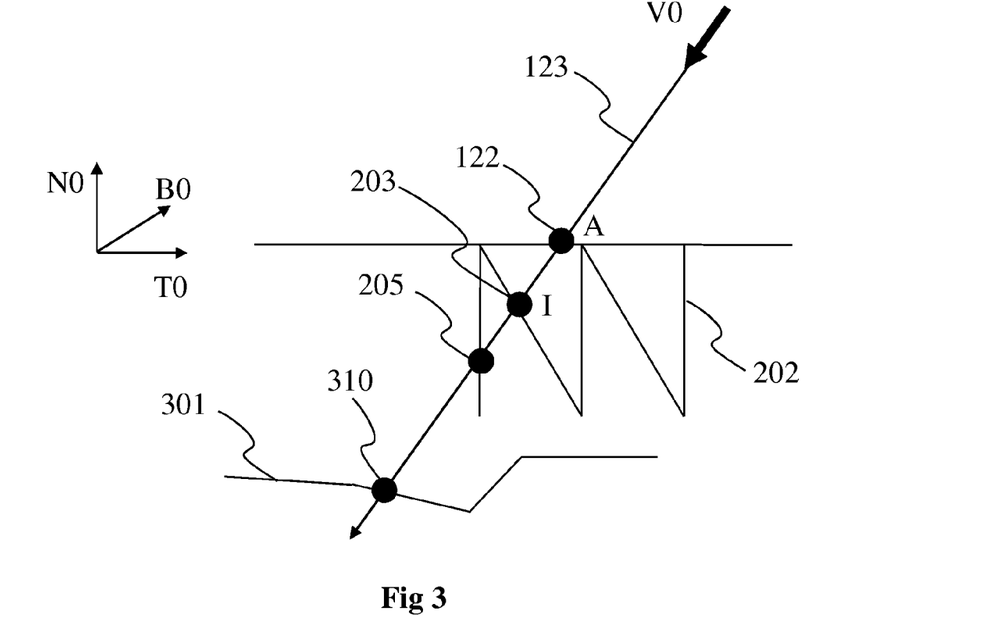

To be able to generate the second level details on-demand in the pixels processor 12, a procedural description of these second level details is required. By procedural description of the 3D object is understood the definition of a grammar that comprises a set of parameters and a set of generation rules. For example, the periodic surface 202 of second level detail shown in FIGS. 2 and 3 has the following procedural description:

two parameters: a cycle interval (T) and an inclination (a):
A function corresponding to the terminal symbols of the grammar and enabling the second level surface element associated with a given pixel to be determined.

Each procedural description of a second level style or detail type is advantageously described by specific parameters and functions. A set of procedural descriptions is advantageously stored in the memory, each description corresponding to a second level detail type or style that can be applied on one or several 3D object surfaces.

To be able to generate third level details on-demand in the pixels processor 12 on the surfaces generated procedurally, the per-pixel displacement mapping technique is advantageously used. These details are advantageously coded and stored in one or several depth maps 211 (also called relief maps, height maps or displacement maps).

The second step of pre-processing is executed only in the case where a generic macrostructure 201B is used as first level surface detail (for example macroscopic details). This pre-processing of generic macrostructures is carried out in a processor 20 for analysis of the mesh topology of the generic macrostructure. This pre-processing corresponds to the calculation of the adjacency of the mesh and to the selection of two best points adjacent to the mesh that are transmitted to the GPU for the calculation of the base of the tangent space. The calculation of adjacency of the mesh for each vertex is based on an input coordinates index table. The selection of best two adjacent points is based on the possibility offered by these points to construct the most orthogonal base possible with the three vertices (that is to say minimizing the scalar product VkVi.VkVj, Vi, Vj and Vk being the three vectors of the orthogonal base).

The third step corresponds to that for which the calculations are carried out live in the GPU. The calculations are carried out both in the vertex shader and in the pixels shader 12 by respectively the vertex shader and the pixel shader.

The calculations carried out in the vertex shader 10 will be discussed first. It is in the vertex shader that the transformations of vertices take place. In a general way, the transformation of vertices is a step that enables three-dimensional and continuous data passed to the GPU to be transformed, into discrete items of two-dimensional data that can be displayed on the display screen of the 3D scene comprising the 3D object. The graphics pipeline is associated with several systems of coordinates. A 3D object is generally defined in a space specific to it, called object space (for example, the coordinates of vertices of a sphere are defined with respect to its centre). However, the position, orientation and scale of each 3D object of a 3D scene are defined with respect to a common space called global space. After the transformation of vertices in the global space, they undergo another transformation, that of the passage to the view space (or camera space). The purpose of this step is to align the Z axis of the global reference with that of the view point (or of the camera). According to a variant, it is possible to transform the vertices directly from the object space to the view space by concatenating the corresponding transformation arrays, this direct transformation being called object/view transformation. Once the vertices of the object are transformed into the view reference, they undergo a perspective projection transformation. The geometry appears smaller and smaller as it moves away from the viewpoint. During this transformation, the vertices conserve their depth (coordinate z) that will be used in the process of elimination of hidden sides. The space in which are defined the vertices after this projection is called the homogenous windowing space. It is so called because the geometric primitives undergo a 3D windowing in order to retain only the primitives found inside the zone targeted by the viewpoint. Finally, the vertices undergo a last transformation that is the passage to the discrete reference of the display screen.

As the position of the viewpoint of the 3D object or the texture coordinates can be modified in an interactive way by an event (generated by a user action or by an animation), the vertex shader 10 carries out the following calculations for each image:

calculation of the update of the vertex texture coordinates: the update of texture coordinates is carried out using a texture transformation array available in the vertex shader 10, calculation of the base of the tangent space in the coordinates of the object space: as the normal vector $N_0$ is provided for each vertex, the tangent vector $T_0$ and the binormal vector $B_0$ associated with the vertex must be calculated to complete the base of the tangent space ($T_0$, $B_0$, $N_0$). Firstly, it must be ensured that the tangent and binormal vectors are orthogonal to the normal vector at the vertex. The two vertices adjacent ($P_{1,2}$) to the vertex considered ($P_0$) are projected into a plane passing by the current vertex (or vertex considered) ($P_0$) and are orthogonal to the normal vector ($N_0$). Then the coordinates of projected points ($P_{1,2}'$), corresponding to the projected vertices, are calculated via the following formula:

$$P_{1,2}' = P_{1,2} + (N_0 \cdot P_0 - N_0 \cdot P_{1,2}) \cdot N_0$$

Secondly, the coordinates of two projected points $P_{1,2}'$ are used in the following two formulas that enable the tangent vector and the binormal vector to be calculated. The tangent vector $T_0$ is defined as being the vector pointing in a direction for which the first texture coordinate u increases. The binormal vector $B_0$ is defined as being the vector pointing in the direction for which the second texture coordinate v increases. By positioning the texture coordinates ($u_i$, $v_i$) of the vertex $P_i$ (i=0, 1, 2) in the formulae for calculating the tangent vector $T_0$ and the binormal vector $B_0$, the following are obtained:

$$T_0 = \text{normalisation}\{[(v_1-v_0)(P_2'-P_0)-(v_2-v_0)(P_1'-P_0)]/[(u_2-u_0)(v_1-v_0)-(u_1-u_0)(v_2-v_0)]\}$$

$$B = \text{normalisation}\{[(u_1-u_0)(P_2'-P_0)-(u_2-u_0)(P_1'-P_0)]/[(u_1-u_0)(v_2-v_0)-(u_2-u_0)(v_1-v_0)]\};$$

transformation of coordinates of the object space in the view space for the base of the tangent space and for the position of the current vertex: the base of the tangent space ($T_0$, $B_0$, $N_0$) and the position of the current vertex ($P_0$) are transformed from the object space to the view space then transmitted to the pixels processor 12 after a rasterization process 11. The transformation is carried out by multiplying the values of the object space by a normal array available in the vertex shader (10).

Once the vertices are projected onto the display screen, the primitives constituted by these vertices must be restored. The step that consists in proceeding to the filling of primitives, for example horizontally line by line, is called rasterization 11. During the filling, the GPU interpolates the data associated with the vertices, such as the depth, the colour, the binormal, the tangent or the texture coordinates, the set of this data with the current filling position forming an entity called a pixel or fragment.

After the step of rasterization, operations on the rasterized pixels are executed in the pixels processor 12. One of these operations corresponds to the texture mapping. The main idea of texture mapping is to associate a 2D image with a 3D surface, the surface of the 3D object, using a function called parametrisation. This function puts in correspondence each vertex (x, y, z) of the meshed surface of the 3D object with a pair of coordinates (u, v) representing a pixel of the texture. The calculations carried out in the pixels processor (12) notably relate to an image for each pixel:

the procedural generation of second level details, also called semi-macroscopic details: the parametric equations of second level detail surfaces are calculated on-the-fly based on generation parameters provided as shader uniform variables enabling an interactive modification of these parameters and based on formalised rules like the shader functions relative to a second level details type or style. These parametric equations are expressed in the texture coordinates (u, v, h) relating to the base of the rasterized tangent space ($T_0$, $B_0$, $N_0$). A general expression of these parametric surfaces is the following:

$$u = f_1(t_1, t_2)$$

$$v = f_2(t_1, t_2)$$

$$h = f_3(t_1, t_2)$$

with $f_1$, $f_2$, $f_3$ continuous functions and $t_1$, $t_2$ live parameters.

Calculation of the intersection point 203 between the observation ray (also called view ray) 123 and the second level detail surface 202: FIG. 3 shows a method implemented to determine the intersection between a surface having a second level of detail and an observation direction by which an observer views the 3D object, according to a particular and non-restrictive embodiment of the invention. FIG. 3 thus shows how to estimate the intersection point 203 between the observation direction 123 and the second level detail surface 202 in the base of the rasterized tangent space ($T_0$, $B_0$, $N_0$). This intersection point 203 is advantageously estimated by ray tracing. Initially, the start point 122 and the direction vector $V_0$ of the ray 123 are calculated: the coordinates ($u_A$, $v_A$, $w_A$) of the start point A 122 are obtained from the rasterization step available in the pixels shader 12 and the direction vector of the rasterized ray at input $V_0$ is expressed in the base of the tangent space ($T_0$, $B_0$, $N_0$). Then, the exact intersection between the ray 123 and each second level detail surface element (point I 203 of coordinates ($u_I$, $v_I$, $w_I$)) is estimated by resolving the following system of equations:

$$u_I = \alpha V_{0x} + u_A \; v_I = \alpha V_{0y} + v_A \; h_I = \alpha V_{0z} + w_A$$

$$u_I = f_1(t_1, t_2) \; v_I = f_2(t_1, t_2) \; h_I = f_3(t_1, t_2)$$

with $\alpha$ a real positive number.
The following is thus obtained:

$$\alpha V_{0x} + u_A = f_1(t_1, t_2)$$

$$\alpha V_{0y} + v_A = f_2(t_1, t_2)$$

$$\alpha V_{0z} + h_A = f_3(t_1, t_2)$$

A system of three equations are obtained for three unknowns (t1, t2, $\alpha$). The same operation is reiterated for each second level detail surface of a set of several second level detail surfaces 202, 301 to determine the intersection point I 203, 310 with the ray 123. The final intersection point is selected as being that having the smallest value of z (that is to say having the minimum $\alpha$ value), that is to say that for which the distance between the point A and the point I is smallest.

Figure 4:
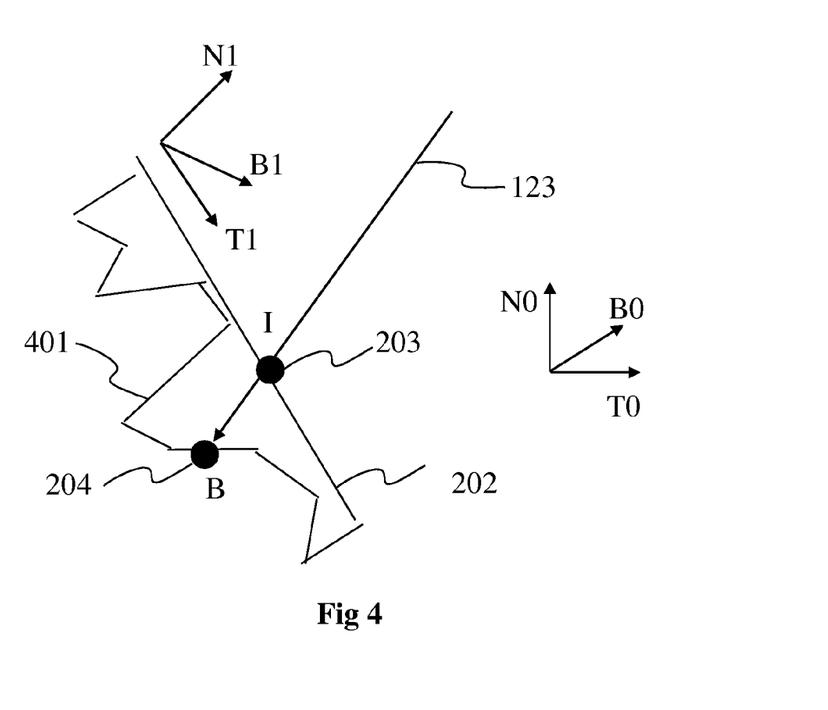

Application of third level details on the second level detail surface determined previously: the third level details, or microscopic details, are applied on the semi-macroscopic surface determined by using the per-pixel displacement mapping technique, as shown in FIG. 4. To correctly read the depth or distance stored in a texture map, it is necessary to operate in the base ($T_1$, $B_1$, $N_1$) relative to the second level detail surface determined instead of operating in the base of the initial tangent space ($T_0$, $B_0$, $N_0$). Once the coordinates of the modified visible point 204 have been determined in the base ($T_1$, $B_1$, $N_1$), it is possible to extract from these coordinates (u, v) the texture colour from the input texture map and the local normal vector from the relief texture map. The quality of third level details is variable and adapts to the available visualisation distance information: the smaller the visualisation distance, the greater the details quality. The coordinates of the modified visible point 204 are then calculated in the base of the view space to update the depth of the associated pixel and to determine the self-shadowing.

Update of the depth of the pixel: the depth of the current pixel is updated.

Figure 5:
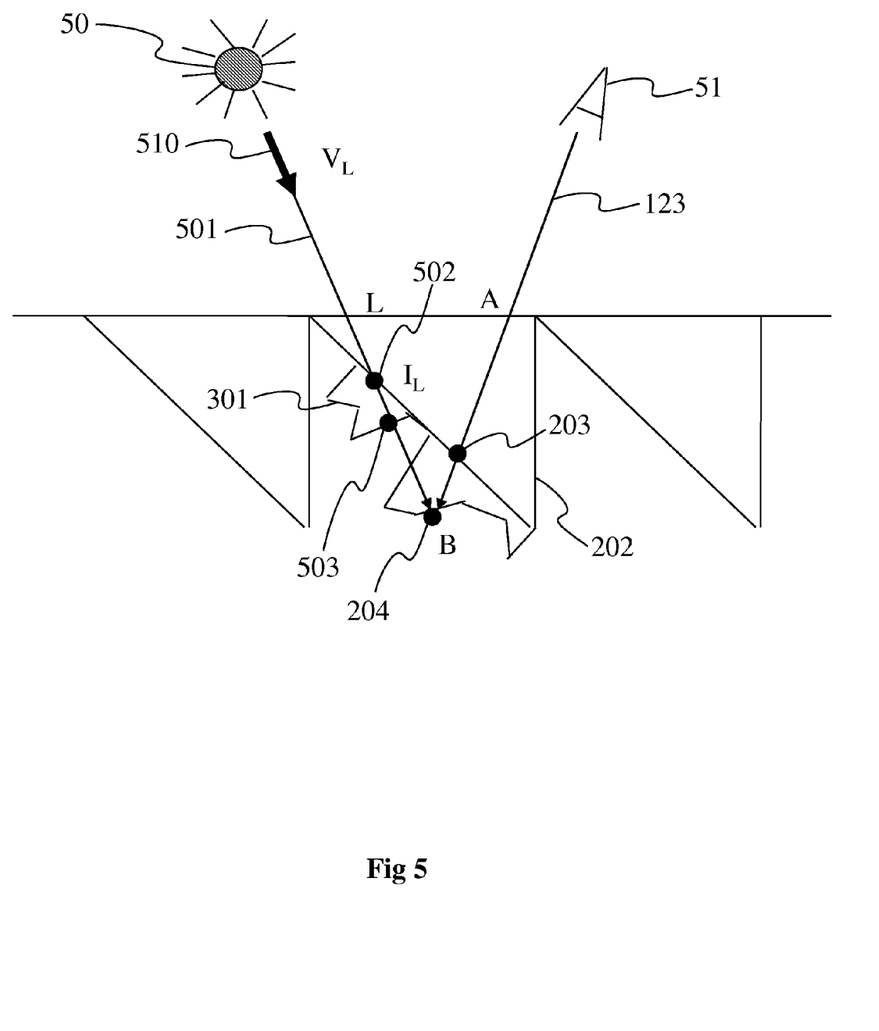
FIG. 5 shows a method for estimation of the lighting of a pixel of the virtual object, according to a particular embodiment of the invention.

Calculation of self-shadowing: a method for estimation of the self-shadowing of the pixel considered is shown in FIG. 5. The self-shadowing of the pixel considered is estimated in the pixels shader 12, that enables a live update of the shadow when the lighting conditions are modified, for example by modifying the lighting parameters of the light source 50 lighting the surface of the 3D object according to a lighting direction 501. The calculation of the shadow associated with the pixel comprises the following steps:

Calculating the relative lighting direction $V_L$ 510 with respect to the modified visible point B 204, Determining the initial start position L for the light ray tracing: this initial start position is calculated in the base of the tangent space ($T_0$, $B_0$, $N_0$), Calculating the intersection points 502, 503 between the light ray 501 and the third level detail surface: these intersections are determined in the same way as described previously for the calculation of the intersection point 203 between the observation ray 123 and the second level detail surface 202 as shown in FIG. 3.

Verification that the pixel considered is in the shadow, that is to say if the light ray 501 has one or several intersection points with the third level detail surface before the modified visible point B 204 is reached: in other words, if the last intersection point has a coordinate z higher than the previous value B·z (that is to say estimated for the preceding intersection point) then the point B is not visible from the light source 50 according to the light direction 501 and the pixel considered is in the shadow.

Determination of the final colour of the pixel: the final colour of the pixel (defined for example by the RGB (Red, Blue, Green) components) is assigned to the pixel by reading the exact position of the point B 204 in the texture map storing the RGB values for each pixel and by applying the lighting by extracting the local normal vector stored in a relief texture map and by applying the shadowing previously calculated.

Figure 6:
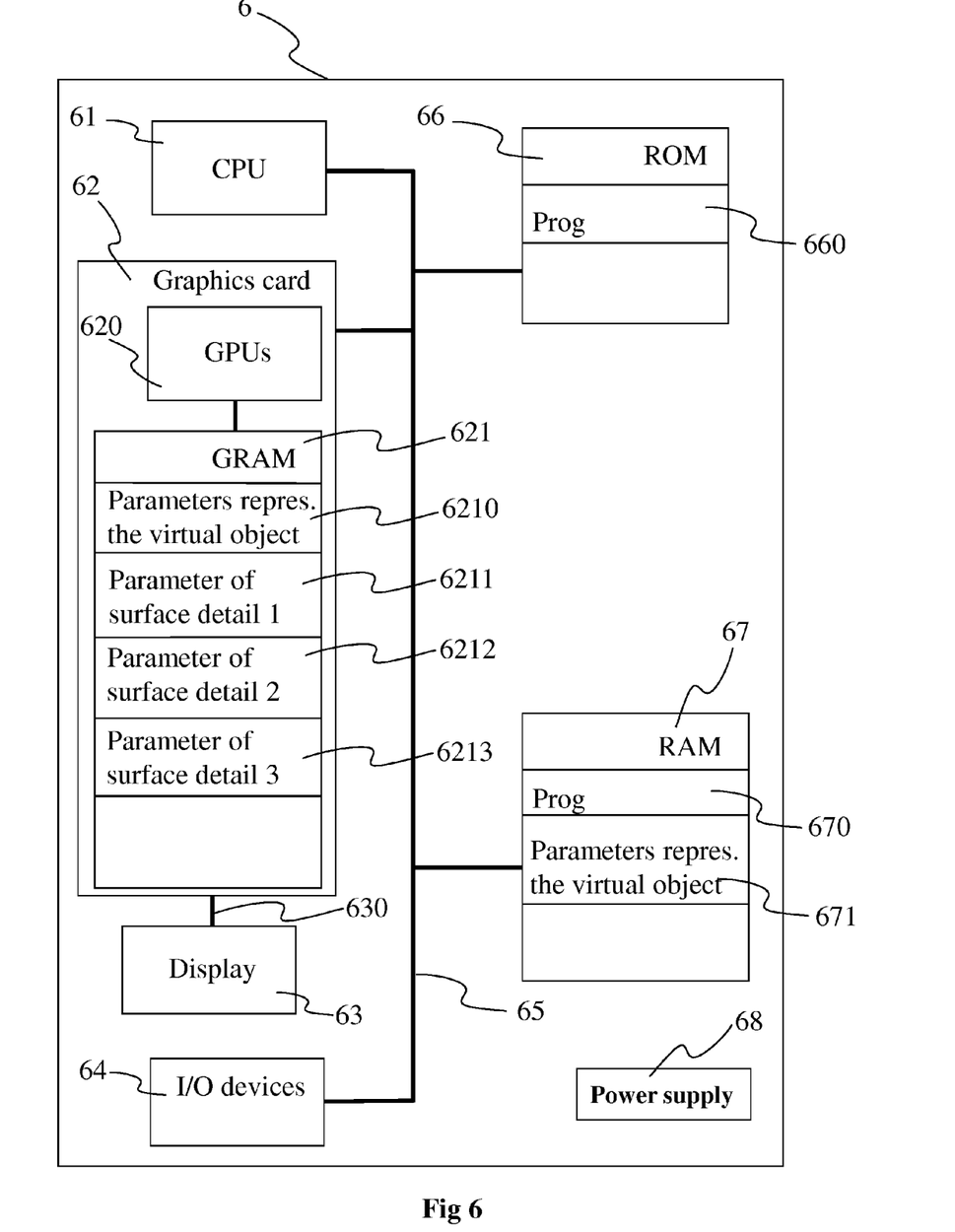
FIG. 6 shows a device implementing a method for estimation of information representative of a pixel of a virtual object, according to a particular embodiment of the invention.

FIG. 6 diagrammatically shows a hardware embodiment of a device 6 adapted for the estimation of information representative of a pixel of a virtual object and for the creation of display signals of one or several images. The device 6 corresponds for example to a personal computer PC, a laptop or a game console.

The device 6 comprises the following elements, connected to each other by a bus 65 of addresses and data that also transports a clock signal:
- a microprocessor 61 (or CPU),
- a graphics card 62 comprising:
    - several Graphics Processing Units (or GPUs) 620,
    - a Graphical Random Access Memory (GRAM) 621,
- a non-volatile memory of ROM (Read Only Memory) type 66,
- a Random Access Memory or RAM 67,
- one or several I/O (Input/Output) devices 64 such as for example a keyboard, a mouse, a webcam, and
- a power source 68.

The device 6 also comprises a display device 63 of display screen type directly connected to the graphics card 62 to display notably the rendering of synthesized images calculated and composed in the graphics card, for example live. The use of a dedicated bus to connect the display device 63 to the graphics card 62 offers the advantage of having much greater data transmission bitrates and thus reducing the latency time for the displaying of images composed by the graphics card. According to a variant, a display device is external to the device 6 and is connected to the device 6 by a cable transmitting the display signals. The device 6, for example the graphics card 62, comprises a means for transmission or connection (not shown in FIG. 4) adapted to transmit a display signal to an external display means such as for example an LCD or plasma screen or a video-projector.

It is noted that the word "register" used in the description of memories 62, 66 and 67 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 61 loads and executes the instructions of the program contained in the RAM 67.

The random access memory 67 notably comprises:
- in a register 630, the operating program of the microprocessor 61 responsible for switching on the device 6,
- parameters 671 representative of the virtual object (for example modelling parameters of the virtual object, the lighting parameters of the virtual object).

The algorithms implementing the steps of the method specific to the invention and described hereafter are stored in the memory GRAM 67 of the graphics card 62 associated with the device 6 implementing these steps. When switched on and once the parameters 670 representative of the environment are loaded into the RAM 67, the graphic processors 620 of the graphics card 62 load these parameters into the GRAM 621 and execute the instructions of these algorithms in the form of microprograms of "shader" type using HLSL (High Level Shader Language) language or GLSL (OpenGL Shading Language) for example.

The random access memory GRAM 621 notably comprises:
- in a register 6210, the parameters representative of the virtual object,
- parameters 6211 representative of the first detail level surface,
- parameters 6212 representative of second detail level surfaces,
- information 6213 representative of the third detail level surface, According to a variant, a part of the RAM 67 is assigned by the CPU 61 for storage of the parameters 6211 to 6213 if the memory storage space available in GRAM 621 is insufficient. This variant however causes greater latency time in the composition of an image comprising a representation of the environment 1 composed from microprograms contained in the GPUs as the data must be transmitted from the graphics card to the random access memory 67 passing by the bus 65 for which the transmission capacities are generally inferior to those available in the graphics card for transmission of data from the GPUs to the GRAM and vice-versa.

According to another variant, the power supply 68 is external to the device 6.

According to another variant, the device 6 comprises an integrated VRAM (Video Random Access Memory). Advantageously the VRAM comprises several image buffers, such as for example a "Front Buffer" storing the image calculated during display on the screen, a "Back Buffer" receiving the pixels being calculated for display on the next image, a depth buffer (or Z-Buffer) storing for each pixel of the image the depth with regard to the viewpoint or the camera. The VRAM also comprises the textures that will be mapped on the facets of the mesh using specific coordinates called texture coordinates.

Figure 7:
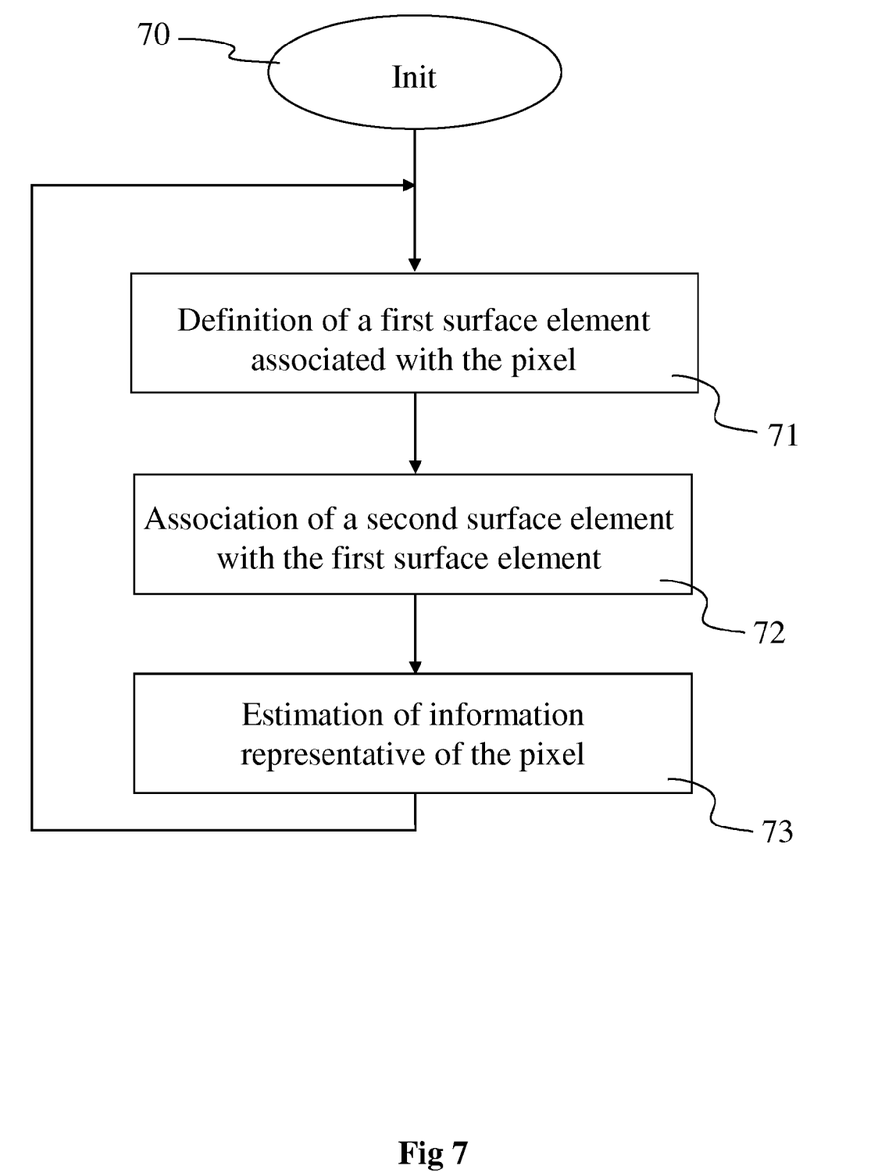
FIG. 7 shows a method for estimation of information representative of a pixel of a virtual object, according to a particular embodiment of the invention.

FIG. 7 shows a method for estimation of information representative of a pixel of a virtual object implemented in a device 6, according to a non-restrictive particularly advantageous embodiment of the invention.

During an initialisation step 70, the different parameters of the device 6 are updated. In particular, the parameters representative of the virtual object are initialised in any way.

Then, during a step 71, a first surface element is associated with the pixel for which it is sought to estimate the information enabling it to be represented. This first surface element is defined as being the surface element belonging to a representation of the virtual object according to a first level of detail that corresponds to the intersection between an observation direction (or view ray) by which a spectator or a user looks at the virtual object through the pixel considered and a surface of the object having a first level of detail. Such a first level of detail surface corresponds for example to a macroscopic or coarse representation of the virtual object, that is to say to a representation made from a restricted number of triangles and vertices, that is to say made from a not very dense mesh. In other words, the first level of detail surface corresponds to the 3D macrostructure of the virtual object. The first surface element associated with the pixel considered is advantageously determined using the ray tracing technique based on the view ray.

Then, during a step 72, a second surface element is associated with the first surface element defined in the preceding step. This second surface element corresponds to the intersection between the observation direction passing by the pixel considered and a first surface having a second level of detail, that is to say representing the surface of the virtual object with a second level of detail. The second level of detail is advantageously more precise and finer than the first level of detail and corresponds for example to a semi-macroscopic view of the surface of the virtual object. The first surface is said to be parametric as it is defined and generated live from a parametric equation. If the virtual object corresponds for example to a building, the first surface corresponds for example to the graphic representation of the structure of an element of a façade of the building, for example a door, or window or a balcony. By playing with the parameters of the parametric equation, it is possible to modify the structure of this or that element of the building or to modify the number of windows or doors per story of the building. According to a variant, the first parametric surface is selected from among a plurality of parametric surfaces, each parametric surface of the plurality corresponding to a graphic representation of a particular structure of the surface. Advantageously, the parametric surface selected from among the plurality of parametric surfaces is that having first an intersection with the direction of observation in the sense of observation of the spectator looking at the virtual object. In other words, the parametric surface selected is that for which the distance separating the first surface element and the second surface element is smallest following the direction of observation.

The use of a parametric surface offers the advantage of minimising the cluttering of the memory, notably when several virtual objects of the same style are rendered live. In fact, according to the invention, only the first surface element representing the virtual object according to a first level of detail uses a mesh, that in addition is not very dense. The requirements in memory to store the information relating to the mesh are thus low and even if several virtual objects must be rendered together, the cluttering of the memory remains low, the information relating to the second level of detail being generated on-the-fly in a procedural way by means of parametric functions stored in the pixels processor (i.e. pixels shader), only the parameters on which they call being stored in the GRAM.

Finally, during a step 73, information enabling the virtual object to be represented according to a third level of detail is associated with the second surface element. The third level of detail is advantageously more precise and finer than the second level of detail and corresponds for example to a microscopic level of detail (for example one brick of a wall). The information representative of a third level of detail is advantageously associated with the second surface element by applying the per-pixel displacement mapping technique. This technique is based on three principles that are the displacement map, the tangent space and ray tracing. The displacement map, also called a relief map or height map, is a two-dimensional image for which the pixels are used to store geometrical data, that is to say depths and normals (normal vectors associated with the pixels of the displacement map). The depths are associated with the micro-relief mapped onto the second surface element and are stored in a first channel of the relief map. The other channels of the relief map are used to store the three components of normals that are calculated from depths. Thus, from the relief map and using the ray tracing technique, it is possible to define the micro-relief (or the depth information representative of a third level of detail) and associate it with the second surface element. For a given pixel of the virtual object (or 3D object) a pixel of the displacement map is associated and a pixel of the texture map is also associated. The texture map is a two-dimensional image for which the pixels are used to store RGBα colour data. Thus, from information enabling the virtual object to be represented according to a third level of detail and associated with the second level of detail surface element, the coordinates of a pixel of the displacement map are obtained, these coordinates enable the RGBα components stored in the texture map to be found.

According to a variant, the information enabling the virtual object to be represented according to a third level of detail corresponds to the information stored in the texture map. According to this variant, the displacement map is not used.

According to another variant, the lighting of the pixel of the virtual object for which are estimated information representing it is determined by calculation of the self-shadowing of this pixel using the ray tracing technique according to a light ray from a light source. According to this variant, it is determined if the pixel considered is lighted directly by the light source or masked by one or several geometry elements associated with the pixels surrounding the pixel of the virtual object. This variant offers the advantage of providing more realism to the rendering of the virtual object as it takes into account the shadow information providing an impression of reinforced 3D.

The preceding steps are advantageously reiterated for the set of pixels of the virtual object, pixel by pixel. Thus, and notably for step 72, the intersection between the observation direction passing through the pixel considered and a first surface having a second level of detail corresponds to the intersection between the observation direction and a surface element of the first surface, the first surface of second level of detail corresponding to the sum of all the surface elements generated for all the pixels of the virtual object.

Naturally, the invention is not limited to the embodiments previously described.

In particular, the invention is not limited to a method for estimation of information representative of a pixel of a virtual object but also extends to any device implementing this method and notably any devices comprising at least one GPU. The implementation of calculations necessary to the estimation of information representative of a pixel of a virtual object is not limited either to an implementation in shader type microprograms but also extends to an implementation in any program type, for example programs that can be executed by a CPU type microprocessor.

The use of the invention is not limited to a live utilisation but also extends to any other utilisation, for example for processing known as postproduction processing in a recording studio for the rendering of synthesis images for example. The implementation of the invention in postproduction offers the advantage of providing an excellent visual rendering in terms of realism notably while reducing the required calculation time.

The invention also relates to a method for composition of a video image, in two dimensions or in three dimensions, for which the information representative of the set of pixels of the virtual object are calculated according to several observation directions and the resulting information representative of pixels is used for the display of pixels of the image, each pixel corresponding to an observation direction. The information representative of a pixel is recalculated to adapt to the different viewpoints of the spectator.

The present invention can be used in postproduction applications but also in video games for the creation of levels, or in the architectural design, whether by programs that can be executed in a PC or portable type computer or in specialised games consoles producing and displaying images live. The device 6 described with respect to FIG. 6 is advantageously equipped with interaction means such as a keyboard and/or joystick, other modes for introduction of commands such as for example vocal recognition being also possible.

The invention claimed is:

1. A method of determining information representative of a pixel of a virtual object, wherein said method comprises:
defining a first surface element associated with said pixel according to a direction of observation of the virtual object, said first surface element belonging to a representation of said virtual object according to a first level of detail,
associating a second surface element with said first surface element, said second surface element being determined by intersection between said direction of observation and a first parametric surface representing the virtual object according to a second level of detail, at least three independent parameters being associated with the first parametric surface, at least one parameter of said independent parameters being defined for each dimension of a three-dimensional space, said first parametric surface being selected from among a set of parametric surfaces each representing the virtual object according to a second level of detail, the selected first parametric surface corresponding to the parametric surface of said set having a smallest distance separating the first surface element from the second surface element,
determining said information representative of said pixel according to said second surface element and information associated with said second surface element enabling the virtual object to be represented according to a third level of detail.

2. The method according to claim 1, wherein said information associated with the second surface element is coded in at least one of the maps of a set of maps comprising:
a texture map, and
a displacement map.

3. The method according to claim 1, wherein the steps of the method are executed live in at least one Graphics Processing Unit (GPU).

4. The method according to claim 1, further comprising determining a lighting information for said pixel by calculating a self-shadowing of said pixel using said information enabling said virtual object to be represented according to said third level of detail associated with said pixel and with a plurality of pixels surrounding said pixel.

5. A device configured for determining an information representative of a pixel of a virtual object, wherein the device comprises at least a processor configured for:
defining a first surface element associated with said pixel according to a direction of observation of the virtual object, said first surface element belonging to representation of said virtual object according to a first level of detail,
associating a second surface element with said first surface element, said second surface element being determined by intersection between said direction of observation and a first parametric surface representing the virtual object according to a second level of detail, at least three independent parameters being associated with the first parametric surface, at least one parameter of said independent parameters being defined for each dimension of a three-dimensional space, said first parametric surface being selected from among a set of parametric surfaces each representing the virtual object according to a second level of detail, the selected first parametric surface corresponding to the parametric surface of said set having a smallest distance separating the first surface element from the second surface element,
determining said information representative of said pixel according to said second surface element and information associated with said second surface element enabling the virtual object to be represented according to a third level of detail.

6. The device according to claim 5, wherein said information associated with the second surface element is coded in at least one of the maps of a set of maps comprising:
a texture map, and
a displacement map.

7. The device according to claim 5, wherein the at least a processor is a Graphics Processing Unit (GPU).

8. The device according to claim 5, wherein the device belongs to a group of devices comprising:
a computer,
a laptop, and
a game console.

9. The device according to claim 5, wherein the at least one processor is further configured for determining a lighting information for said pixel by calculating a self-shadowing of said pixel using said information enabling said virtual object to be represented according to said third level of detail associated with said pixel and with a plurality.

10. A non-transitory processor readable medium having stored therein instructions for causing a processor to
define a first surface element associated with said pixel according to a direction of observation of the virtual object, said first surface element belonging to a representation of said virtual object according to a first level of detail,
associate a second surface element with said first surface element, said second surface element being determined by intersection between said direction of observation and a first parametric surface representing the virtual object according to a second level of detail, at least three independent parameters being associated with the first parametric surface, at least one parameter of said independent parameters being defined for each dimension of a three-dimensional space, said first parametric surface being selected from among a set of parametric surfaces each representing the virtual object according to a second level of detail, the selected first parametric surface corresponding to the parametric surface of said set having a smallest distance separating the first surface element from the second surface element, and
determine said information representative of said pixel according to said second surface element and information associated with said second surface element enabling the virtual object to be represented according to a third level of detail.

* * * * *